3,028,392
NON-FLOCCULATING PHTHALOCYANINE BLUE PIGMENTS

Mitchell Dudnikov, East Cleveland, Ohio, assignor to The Harshaw Chemical Company, Cleveland, Ohio, a corporation of Ohio
No Drawing. Filed Dec. 7, 1959, Ser. No. 857,531
11 Claims. (Cl. 260—314.5)

Phthalocyanine pigments are brilliant blue pigments of excellent fastness properties and high tinctorial strength, and are generally recognized to be one of the outstanding blue pigments available. Phthalocyanine pigments are polymorphic porphin type compounds of the following structures wherein Me represents a metal selected from the group consisting of copper, nickel, cobalt and iron:

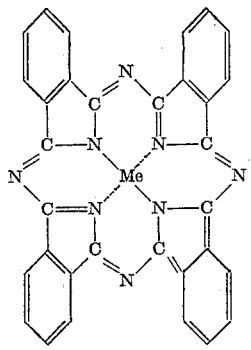

The pattern of alternating double bonds is believed to make possible a system of identical resonating structures, which system is thought to be responsible for the intense color of the compound.

The two principal crystal forms of unsubstituted phthalocyanine blue are the red shade or alpha type and the green shade or beta type, the beta type being the more stable. Substitution of one chlorine, or other substituent, in the 4 or 5 position of any one benzene ring will prevent the formation of the beta type crystal by steric hindrance, and such substitution is a method commonly used where a red shade is desired. This stabilization of the red form is important in preparing many commercial types of phthalocyanine blue pigments.

Offsetting their desirable properties, phthalo blues have two shortcomings. The first of these is that both the alpha type and the beta type crystals tend to flocculate when used in paints, enamels and lacquers, which results in loss of tinting strength and non-uniformity. Flocculation is the phenomenon whereby the pigment particles tend to agglomerate or flocculate into larger particles, which settle to the bottom of the container, with the result that the coloring material in the bottom of the container tends to be darker in shade due to the larger number of pigment particles concentrated there. Thus, for example, if a paint having phthalocyanine blue pigment as a tint in $TiO_2$ is sprayed on a panel, after which a portion of the paint from the bottom of the can is poured onto the same panel, a distinct difference in shading between the two portions may readily be observed. This can be highly disadvantageous in many applications. For example, if it is desired to use the same shade in a manufacturing plant for both spraying and dipping different parts of a mechanism or product which are later assembled together, a flocculating paint cannot be used, because the dipped member will be lighter in shade than the sprayed member.

A second shortcoming of the phthalocyanine blues lies in the slight solubility of the pigment in certain organic solvents. Thus, the alpha type (red shade) crystals have the characteristic that when suspended in certain organic solvents, such as xylene, toluene, ethyl acetate and ketones, they tend to dissolve and reprecipitate in the beta type (green shade) of crystal. The beta type, however, is inherently crystal stable when exposed to all known organic solvents. Since spray paints and lacquers frequently contain such organic solvents, this constitutes a problem when alpha type phthalocyanine blue is employed. The difficulty is generally overcome by modifying the copper phthalocyanine molecule by the addition of chlorine to form monochlorophthalocyanine blue. The presence of chlorine in the 4 position inhibits the solution and recrystallization to the beta form. Other inhibitors are tin and aluminum phthalocyanines. These two, however, are soluble in certain alcohols often found in enamels, so that in practice, monochlorophthalocyanine blue is used as a non-crystallizing red shade blue. Monochlorophthalocyanine blue, however, is also subject to flocculation.

Numerous process means have been employed to produce non-flocculating phthalocyanine pigments. The non-flocculation treatments in the past have been carried out on a preformed phthalocyanine "crude" or preformed phthalocyanine pigment. The word "crude" as used herein may be defined as a phthalocyanine material existing as a mixture of alpha type (red shade) and beta type (green shade) crystals of a size large enough to reduce tinctorial strength and containing organic and inorganic impurities. A substantial saving would be effected if non-flocculation treatments were carried out in the same stage with the production of crude phthalocyanine pigment. The non-flocculating agents of the prior art, however, could not be simultaneously reacted with the components employed in the reaction mixture for the formation of crude phthalocyanine pigment. The non-flocculating agents of the prior art were unacceptable for the production of a non-flocculating crude because of one or more of the following deficiencies: (1) they broke down when subjected to the high reaction temperatures; (2) they inhibited the formation of the blue crude by sealing off reaction components; and (3) they inhibited the formation of the blue crude by competing with the reaction components in the formation of an organic byproduct.

It is, therefore, an object of this invention to produce a non-flocculating crude phthalocyanine material.

It is another object of this invention to produce a non-flocculating crude phthalocyanine material by simultaneously incorporating a non-flocculating agent in the phthalocyanine material reaction components.

It is a further object of this invention to produce a non-crystallizing non-flocculating green shade copper phthalocyanine pigment.

It is still another object of this invention to produce a non-crystallizing non-flocculating red shade copper phthalocyanine pigment.

I have discovered that the addition of pyromellitic acid or pyromellitic dianhydride to the reaction mixture commonly employed in certain processes for the production of crude phthalocyanine pigments will result in the formation of a non-flocculating crude phthalocyanine without any detrimental effects on the phthalocyanine reaction. The crude non-flocculating phthalocyanine prepared in this manner may be purified to a monocrystalline pigment form.

The exact mechanism of the non-flocculating procedure is not known. It is known only that the presence of small quantities of pyromellitic dianhydride or pyromellitic acid (less than molar amounts) imparts to the phthalocyanine blue crude, resistance to flocculation. Whether the pyromellitic dianhydride affects the crystal structure in some way, or whether it becomes part of some of the molecules of the finished product is not certain.

Phthalocyanine pigments can be prepared from a number of phthalo or phthalyl compounds. The phthalocyanine crude material of this invention may be prepared from either of two processes, known to those skilled in the art as (1) the phthalic anhydride-urea solvent method, and (2) the phthalic anhydride-urea dry fusion method. Two other commercially known processes, namely the phthalonitrile solvent method and the phthalonitrile fusion method are unsuitable for the purposes of this invention. Apparently the pyromellitic dianhydride and pyromellitic acid will impart their non-flocculative effect to the crude only when the reaction rate of the components of the phthalocyanine is slow. While the exact mechanism is not known, it is known that the rapid reaction which takes place in the phthalonitrile solvent method and the phthalonitrile fusion method prevents the pyromellitic dianhydride and the pyromellitic acid from exerting any non-flocculating effect.

Whichever of the two suitable methods is used, the phthalocyanine prepared is in the form of a base material, or as it is commonly referred to in the art, a crude material. This crude contains organic and inorganic impurities which are removed with acid or alkali treatment, yielding nearly pure phthalocyanine blue in non-pigment form. The crude, however, is low in tinctorial properties. This is due to the fact that it consists of a mixture of alpha type (red shade) and beta type (green shade) crystals, most of which are large, and, therefore, low in pigmentary value. To convert the crude into a pigment, these crystals are ordinarily reduced to small uniform particles of a single crystal type by dissolving the crude in 98% $H_2SO_4$, a procedure known as acid pasting, and then reprecipitating the crude by dilution of the acid under controlled conditions. This produces a precipitate of uniform size, single crystal form, and good purity, which is the red shade of the pigment, and in the case of the chlorine-free product, is a pigment of the crystallizing type.

Where a red shade noncrystallizing phthalocyanine is desired monochlorophthalocyanine is employed. Monochlorophthalocyanine blue crude, as was mentioned, is produced by replacing a portion of the phthalic anhydride starting material with 4-chlorophthalic anhydride. The acid conversion is carried out as in crystallizing types and a red shade, non-crystallizing, blue is obtained. If a green shade of blue is desired, the reprecipitated product is converted to the stable green form by the process known as salt grinding.

I have now found, that by adding amounts of from about 2% to about 20% based on the total weight of reactants of pyromellitic dianhydride or pyromellitic acid to the initial reactants used in any of the previously given methods of producing a pigment crude, a product is obtained which is non-flocculating and which can be ultimately processed into a pigment of any desired crystalline structure. The preferred range of pyromellitic dianhydride and pyromellitic acid is from 4% to 8% based on the total weight of reactants.

As examples of my invention, I synthesized metal phthalocyanines by a dry fusion process and by a solvent process. The metallic constituent of the phthalocyanines was derived from a salt selected from the group consisting of $CuSO_4$, $CuCl_2$, $Cu_2Cl_2$, $NiSO_4$, $NiCl_2$, $CoCl_2$, $CoBr_2$, $FeCl_3$, $CoSO_4$ and mixtures thereof. It is to be understood that the solvent process of this invention may employ any of those solvents commonly used in the phthalic anhydride-urea solvent method such as, for instance, trichlorobenzene, sulfuric acid washed kerosene, trichloro acetic acid, and dinitrobenzene (or any inert solvent boiling above 210° C.).

*Example I*

The following ingredients were well mixed on rolls and ground in a micropulverizer. Mixing and grinding could, of course, be performed in any well known manner.

| | Gms. |
|---|---|
| Phthalic anhydride | 106.0 |
| Pyromellitic dianhydride | 7.0 |
| Urea | 150.0 |
| $MoO_3$ | .6 |
| $CuSO_4$ | 18.0 |
| $CuCl_2$ | 18.0 |

The mixture was then heated to a temperature of 180° C. and maintained at that temperature for a period of approximately 12 hours.

While the reaction may be carried out without a catalyst, the degree of completeness of the reaction may be increased from about 20% to about 80% by the use of a $MoO_3$ catalyst. Other catalysts which may be beneficially employed are ammonium molybdate, sodium molybdate, molybdic acid, silicomolybdic acid, ammonium metavanadate, arsenous oxide, antimony trioxide, boric acid, zinc oxide, mercuric oxide, aluminum oxide, sodium carbonate, lead oxide, sodium stannate, lead titanate, bismuth trioxide, diammonium phosphate, ammonium persulfate, tungstic acid, ammonium chromate, selenium oxide, potassium iodate, potassium permanganate and ferric oxide.

A fusion reaction took place during this time, and the reacted mixture was then cooled to room temperature. This mixture was in the form of a cellular mass which was readily reduced in particle size by moderate grinding.

This crude was then digested in 4000 cc. of 5% $H_2SO_4$ at 60° C. for two hours to remove acid soluble impurities. The slurry was filtered and washed with water to a substantially acid free condition. This filter cake was then washed with 4000 cc. of solution of 15% NaOH and 15% $NH_4OH$. The combined basic solution was used, as it appeared to give a more satisfactory result, though a solution of a single base could have been used. Finally, the filter cake was washed substantially alkaline free with water.

93.0 gm. of phthalocyanine blue was recovered. This was in the form of purified crude.

The acid pasting step was then performed. This consisted of dissolving the purified crude in 98% $H_2SO_4$, 10 parts of acid by weight being used per one part of crude. The blue in acid solution was then reprecipitated by gradually adding the acid-blue solution to 50 to 100 parts by weight of water. A cationic surface active agent, such as alkyl tolyl methyl trimethyl ammonium chloride (trade name: Hyamine 2389) was added to the slurry for the purpose of improving the softness and wettability of the finished product. The slurry was then filtered, washed acid-free with water, air blown, and dried.

The resulting pigment was of the alpha type or red shade and was non-flocculating in organic resinous systems, as is illustrated by the following test which was made:

An alkyd resin enamel was prepared, using the phthalocyanine blue product and titanium dioxide, and a suitable proportion of an alkyd resin vehicle.

This enamel was sprayed on a metal panel. The panel was allowed to dry for one hour. The remaining enamel was manually shaken in its container and poured over the lower portion of the sprayed panel, overlapping the sprayed area, and allowed to dry. There was no discernible difference in color intensity between the sprayed and the poured portions of the panel. This is the usual test for the non-flocculating characteristic.

*Example II*

The following materials were mixed in a suitable manner:

| | Gms. |
|---|---|
| Phthalic acid | 138.0 |
| Urea | 174.0 |
| $CuSO_4$ | 42.0 |
| $MoO_3$ | .43 |
| Pyromellitic dianhydride | 7.0 |

500 grams of trichlorobenzene was then added and the mixture was then heated at a temperature of 180° C. over a period of 40 to 45 minutes. The temperature was raised from 180° C. to 205° C. over a period of from 40 to 45 minutes. The temperature was then maintained at 205° C. for a period of three hours. The resulting crude reaction product was cooled and filtered and contaminating amounts of trichlorobenzene were removed by an alcohol wash or by a steaming operation. The crude reaction product was then reduced to pigment form by the process outlined in Example I. The resulting pigment was a red shade pigment of non-flocculating properties.

*Example III*

In order to make 4-monochloro phthalocyanine blue, the following dry mix was prepared by mixing on rolls and grinding in a micropulverizer:

| | Gms. |
|---|---|
| Phthalic anhydride | 79.5 |
| 4-chloro phthalic anhydride | 32.6 |
| Pyromellitic acid | 7.0 |
| Urea | 150.0 |
| $MoO_3$ | .6 |
| $CuSO_4$ | 18.0 |
| $CuCl_2$ | 18.0 |

The mixture was heated to a temperature of 180° C. and maintained at that temperature for around 12 hours, as in Example I. The fused mix, after the reaction was completed, was reduced in particle size by moderate grinding.

As in Example I, this crude was digested in 5% $H_2SO_4$, washed with the basic solution, and with water. 97 grams of 4-chloro phthalocyanine blue in the form of purified crude was recovered, which was acid pasted, and reprecipitated. A surface active agent was added, the slurry was filtered, washed with water, air blown and dried as before. The resulting pigment was a non-crystallizing red shade, and when tested similarly to the pigment of Example I was seen to be non-flocculating.

*Example IV*

The dry mix of Example III was again prepared and 500 grams of trichlorobenzene was added thereto. The mixture was heated at a temperature of 180° C. over a period of 40 to 45 minutes. The temperature was raised from 180° C. to 205° C. over a period of from 40 to 45 minutes. The temperature was then maintained at 205° C. for a period of three hours. The resulting crude reaction product was cooled and filtered and contaminating amounts of trichlorobenzene were removed by an alcohol wash or by a steaming operation. The crude reaction product was then reduced to pigment form by the process outlined in Example I. The resulting pigment was a red shade pigment of non-flocculating, non-crystallizing properties.

*Example V*

The procedure of Example I was repeated, with the exception that 36 grams of $NiSO_4$ was substituted for the $CuSO_4$ and $CuCl_2$. The resulting product, after all of the steps outlined in Example I were performed, was a red shade pigment of good quality having non-flocculating properties. $NiCl_2$ could also have been used instead of $NiSO_4$.

*Example VI*

The procedure of Example I was repeated, with the exception that 32 grams of $CoSO_4$ was substituted for the $CuSO_4$ and $CuCl_2$. The resulting product, after all of the steps outlined in Example I were performed, was a red shade pigment of good quality, having non-flocculating properties. 32 grams of $CoCl_2$ or 50 grams of $CoBr_2$ could have been used instead of the $CoSO_4$.

*Example VII*

The procedure of Example I was repeated, with the exception that 32 grams of $FeSO_4$ was substituted for the $CuSO_4$ and $CuCl_2$. The resulting product, after all of the steps outlined in Example I were performed, was a green shade pigment of good quality, having non-flocculating properties. 32 grams of $FeCl_3$ could have been used in place of the $FeSO_4$.

Experiments were also performed to determine the range within which the pyromellitic dianhydride would produce a product of non-flocculating characteristic. The procedure was that which is set forth in Example I and the quantities of ingredients were the same except for the amount of pyromellitic dianhydride. The following table gives the results which were obtained:

| Grams of pyromellitic dianhydride combined with 292.6 grams of other starting materials of Example I | Flocculation characteristic |
|---|---|
| 25.0 | Non-flocculating. |
| 12.5 | Do. |
| 7.5 | Do. |
| 5.0 | Do. |
| 4.0 | Flocculation-resistant. |
| 3.0 | Less flocculation-resistant than the preceding example. |
| 0 | Flocculating. |

In practice, the maximum amounts of pyromellitic acid and pyromellitic dianhydride which may be employed are only limited by the decrease in tinctorial strength of the pigment product brought about by the diluting effect of the non-flocculating agents.

What I claim is:

1. The method of making a non-flocculating crude phthalocyanine material of a type containing both alpha and beta crystals suitable for processing into a pigment comprising adding to the initial reactants a compound from the class consisting of pyromellitic dianhydride and pyromellitic acid in amounts in excess of about 2% of the total weight of the initial reactants, said initial reactants comprising urea, a metal salt, and a phthalic compound from the class consisting of phthalic anhydride, phthalic acid, chlorinated phthalic acid, and chlorinated phthalic anhydride, reacting said reactants, and recovering the crude phthalocyanine reaction product.

2. The process of claim 1 wherein the reactants are reacted in the presence of a solvent for said reactants.

3. The process of claim 1 in which the metal salt is a salt selected from the group consisting of $CuSO_4$, $CuCl_2$, $Cu_2Cl_2$, $NiSO_4$, $NiCl_2$, $CoCl_2$, $CoBr_2$, $FeCl_3$, $CoSO_4$, and mixtures thereof.

4. The process of claim 1 in which the metal salt is $CuSO_4$.

5. The process of claim 1 in which the metal salt is $CuCl_2$.

6. The process of claim 1 in which the metal salt is a mixture of $CuSO_4$ and $CuCl_2$.

7. The method of making a non-flocculating crude phthalocyanine material of a type containing both alpha and beta crystals suitable for processing into a pigment comprising adding a compound selected from the group consisting of a pyromellitic acid and pyromellitic dianhydride in an amount ranging from 2% by weight of the initial reactants to 20% by weight of the initial reactants, said initial reactants comprising urea, a metal salt, and a phthalic compound from the class consisting of phthalic anhydride, phthalic acid, chlorinated phthalic acid, and chlorinated phthalic anhydride, heating said reactants to a temperature sufficient to initiate a fusion reaction, and maintaining said temperature for a period of time sufficient to enable substantially all of said reactants to react.

8. The method of making a non-flocculating pigment of the phthalocyanine type containing of only one crystalline form comprising adding a compound selected from the group consisting of a pyromellitic dianhydride and pyromellitic acid in an amount ranging from 2% by weight of the initial reactants to about 20% by weight, said initial reactants comprising urea, a metal salt selected from the group consisting of $CuSO_4$, $CuCl_2$, $NiSO_4$, $NiCl_2$, $CoCl_2$, $CoBr_2$, $FeCl_3$, $CoSO_4$, and mixtures thereof, and a phthalic compound from the class consisting of phthalic anhydride, phthalic acid, chlorinated phthalic acid, and chlorinated phthalic anhydride, heating said reactants to a temperature sufficient to initiate a fusion reaction, and maintaining said temperature for a period of time sufficient to enable substantially all of said reactants to react, cooling the resulting product, digesting in dilute acid, washing with water and then with a dilute basic solution, dissolving the resulting product in 98% $H_2SO_4$, reprecipitating the said product by the gradual addition of water, and filtering, washing, air blowing and drying the resulting precipitate.

9. The method of claim 8 wherein the phthalic compound is chlorinated phthalic acid.

10. The method of claim 8 wherein the phthalic compound is chlorinated phthalic anhydride.

11. The method of claim 8 wherein the phthalic compound is chlorinated phthalic acid and wherein the resulting precipitate is subjected to a salt grinding operation.

References Cited in the file of this patent

UNITED STATES PATENTS 2,213,726    Wyler  ---------------- Sept. 3, 1940

OTHER REFERENCES

Lubs: "Chemistry of Synthetic Dyes and Pigments," pages 584–88 (1955), Reinhold Pub. Corp.